(12) United States Patent
Shattuck

(10) Patent No.: US 6,417,842 B1
(45) Date of Patent: Jul. 9, 2002

(54) ENGONOMIC MOUSE APPARATUS

(76) Inventor: Wesley E. Shattuck, 9 Ash St., Derry, NH (US) 03038

( * ) Notice: Subject to any disclaimer, the term of this patent is extended or adjusted under 35 U.S.C. 154(b) by 0 days.

(21) Appl. No.: 09/330,917

(22) Filed: Jun. 11, 1999

(51) Int. Cl.[7] .................................................. G09G 5/08
(52) U.S. Cl. ...................................... 345/163; 345/156
(58) Field of Search ......................................... 345/163

(56) References Cited

U.S. PATENT DOCUMENTS

| | | |
|---|---|---|
| 4,780,707 A | 10/1988 | Selker |
| 4,862,165 A | 8/1989 | Gart |
| 5,006,836 A | 4/1991 | Cooper |
| 5,268,674 A | 12/1993 | Howard et al. |
| 5,355,148 A | 10/1994 | Anderson |
| 5,576,733 A | 11/1996 | Lo |
| 5,754,126 A | 5/1998 | Hilbrink et al. |
| 5,805,143 A | 9/1998 | Myers |
| 5,880,715 A | 3/1999 | Garrett |
| 5,883,690 A | 3/1999 | Meyers et al. |

FOREIGN PATENT DOCUMENTS

JP   08359434   *   6/1998

* cited by examiner

*Primary Examiner*—Steven Saras
*Assistant Examiner*—Christopher J. Maier
(74) *Attorney, Agent, or Firm*—Scott J. Asmus; Vernon C. Maine; Maine & Asmus

(57) ABSTRACT

An ergonomic mouse accessory that allows the user to vary the manner in which the control buttons of the mouse are operated, thereby reducing or eliminating repetitive strain injuries (RSI). A trigger arm rises from an attaching means, wherein the attaching means interconnects with the mouse. The user can rotate and otherwise position the trigger arm to constantly change the manner in which the mouse buttons are manipulated.

20 Claims, 9 Drawing Sheets

ENGONOMIC MOUSE APPARATUS

BACKGROUND OF THE INVENTION

Technical Field of the Invention

The present invention relates to the field of ergonomics in the computer industry, and more specifically to a device that aids in reducing user strain, fatigue, discomfort, and pain when operating a computer mouse by providing a device that facilitates mouse clicking operations.

Since the advent of the computer, the interface between the user and the computer has remained essentially stable. A typical computer comes equipped with a keyboard and a mouse as a means of controlling the computer and entering data. The prevalence of computers and the amount of usage have led to repetitive strain injuries (RSI).

The cursor control and selection of data and objects by a pointer is accomplished through a mouse, trackball, touch pad, light pencil, and digitizing tablet, however the mouse is the most common. The computer mouse is used to move a cursor on the monitor and has one or more operational buttons for other functionality. The typical mouse has two or more buttons. The mouse housing rests on a horizontal surface and sensors in the mouse detect the movement of the mouse across the surface. Various mouse designs are being manufactured with varying shapes and configurations.

The mouse buttons work in conjunction with the mouse to perform various functions, such as grabbing data or objects and dragging them to another location, manipulating menu driven applications, graphic design and drawings, and invoking new applications. The buttons are also used to invoke pull down menus for additional commands displayed on the monitor. The operator control of the buttons usually requires the user to leave a finger on at least one button, maintain pressure on a button for drag operations, and multiple fast clicking. Graphic design and computer artwork requires precision mouse control and extensive mouse manipulations. The Internet has increased the applicability of mouse operations and increased the number of users manipulating mice as well as the frequency of mouse operations. More mouse click manipulations are required for 'point and click' websites and Internet operations.

Repetitive strain injury refers to the many ailments associated with repetitive motions and static pressure/loading, and excessive wear and tear on the soft tissues on the body, namely tendons and nerves. Other terms related to RSI include Cumulative Trauma Disorder, Musculoskeletal Disorders, Occupational Overuse Syndrome, Repetitive Motion Injury, Upper Extremity Musculoskeletal Disorder, and Work-Related Upper Limb Disorders.

Persons that work with computers for extended periods of time can develop inflammations, such as Tenosynovitis (an inflammation of the tendon sheath), Tendonitis (an inflammation of a tendon), Epicondylitis (an inflammation of the tendons where they attach to the elbow bone), Carpal Tunnel Syndrome (a condition where the median nerve does not function properly), Cubital Tunnel Syndrome (compression of the ulnar nerve where it passes the elbow), and Thoracic Outlet Syndrome (affects the neck and shoulders)—all of which are RSI related.

Those that do experience RSI are likely to have symptoms such as tightness, soreness, aching, throbbing, sharp pain, numbness, tingling, burning, swelling, and loss of strength in the upper extremities. Once inflicted, the user can resort to braces, splints and repositioning devices to ease the pain. Surgery has been tried with varying results. However, none of the prior devices attempts to address the problem itself—repetition.

Businesses and the economy suffer from RSI due to the loss or lessening of work caused by RSI as well as the expenses associated with equipping employees with ergonomic options. The medical expenses for surgery and therapy is very costly, and is a burden to businesses, medical plans, and individuals. There have even been lawsuits against employers and manufacturers of devices that induced or caused RSI.

The computer mouse is particularly troublesome because the user usually needs to press the same button numerous times while the hand remains in the same position. For some operations, the user must keep a particular button pressed for a varying lengths of time, requiring static pressure/loading. The functionality and usage of the computer mouse has increased dramatically as society has adopted more click intensive applications. Most mice allow single and double clicks to invoke different activities. Most times the clicks have to be in a rapid succession within a small time interval. Users can also manipulate webpages on the Internet via mice, drastically elevating the usage and frequency of mouse operations as well as the number of individuals using mice.

Drafting and drawing applications are another area where mouse operations require mouse intensive manipulations. The mouse buttons are used to draw lines and the user typically depresses and holds buttons while drawing. Precise control of the cursor is important for computer graphics. Persons involved in design or artwork may use a mouse for many hours during a day with few breaks.

There have been a variety of ergonomic keyboards and mice that are designed to lessen RSI, or otherwise relieve the repetition and fatigue associated with computer usage. These devices are additional accessories or new designs that must replace the existing units and generally are more expensive than the standard devices. The implementation of speech recognition software, foot-operated mouse designs, and ergonomically designed mice have met with limited success and/or commercial appeal.

In U.S. Pat. No. 5,576,733, a vertically oriented mouse is disclosed, with control buttons located on the slope of the mouse. This design is intended to provide a more natural position to lessen fatigue. Another ergonomic mouse design is shown in U.S. Pat. No. 4,862,165, having a rounded arched design that is meant to reduce fatigue. There are support pads for the thumb and forefinger, and control buttons can be implemented in addition to or in place of the support pads. Yet another ergonomic mouse design is portrayed in U.S. Pat. No. 5,880,715. This pyramid shape mouse with four triangle-shaped inclined faces has control buttons on the faces. In all these designs the user is still required to perform repetitive motions and static pressure with the same fingers and in the same position.

The invention discussed in U.S. Pat. No. 5,805,143 is for a mouse that has a stylus removably secured to the mouse and which allows the user to operate the mouse in a more artistic fashion. The stylus provides a mechanism to operate the control buttons in a more precise fashion, which is specially tailored to drawing and graphic design. The stylus mount clips-on to the mouse and the stylus is inserted into the mount. The user holds the stylus like a pen or paint brush, and operates the control buttons of the mouse using the stylus. This design is not practical for normal operations, and the user has to maintain static pressure on the stylus during all mouse operations.

An early mouse design is shown in U.S. Pat. No. 4,780,707 that discloses a mouse base that has an opening on the top surface that engages a stylus. The stylus contains the electronics to operate as a mouse independently or in combination with the mouse base. The pen shape device must be held statically during all operations and the control buttons on the stem of the pen unit would still require repetitive motion.

U.S. Pat. No. 5,883,690 is for a removable joystick adapter. The invention uses clips to attach a base piece onto a directional keypad of a video game controller. A joystick is integrated with the base so as to allow the joystick to manipulate the buttons of the keypad. This invention is intended to manipulate keypads via a joystick, which would not be practical for the mouse operations.

Other commercial products have tried to alleviate RSI and related injuries, and there are numerous wrist braces and support structures to maintain ergonomic positioning of the hand. These devices are somewhat cumbersome to use and have not been generally accepted in the software community. Improved commercial mice are continuously entering the market, but all have control buttons as a user interface.

What is needed is a simple and inexpensive means to reduce or eliminate RSI. The prior art devices all strove to create a more ergonomic design, while not addressing the repetition component that causes fatigue, aggravation, inflammation, and injuries. What is needed is a device that reduces or eliminates repetitive motions, static pressure/loading that lead to this fatigue and injuries. This device should be easily installed on existing mice and easily manufactured into mouse designs. Such a device should be inexpensive and not require purchasing expensive different equipment. It should allow a user to install it onto an existing mouse and be removable or retractable. The device should be compatible with all mouse designs.

SUMMARY OF THE INVENTION

Accordingly, an object of the present invention is to reduce repetitive motion and static loading when using a computer mouse. The present invention allows the user to use different motions and different fingers to operate the mouse buttons. A trigger arm is used to extend the mouse button operability and allow the user to reposition the trigger arm freely during operations. By introducing numerous positions during use, the user can reduce or eliminate repetition. The unit can be operated by any finger of either hand and repositioned at any time to allow operation be a different finger of either hand, including the thumb.

Another object of the invention is to provide a simple and inexpensive device that can be attached to an existing mouse. Many users have become accustomed to their existing mouse design. In one embodiment, the present device can be affixed to an existing mouse in many different manners using adhesive, Velcro, screw, rivets, and snap-fit means. The device can also be easily fabricated into mouse designs, either as a permanent structure or a 'flip-up' feature, allowing users to continue to use a familiar mouse, but with the additional ergonomic feature of the present invention. Various designs can be used so that the device can be operational on all computer mice.

A further object is to provide a device that is removable or retractable from the mouse so that the user can control the mouse ergonomics and engage or disengage at the user's discretion. Whether the invention is manufactured into the design or is an attachment to an existing mouse, one of the embodiments allows the user to remove or retract the device.

Another object of the invention is to have a means of advertising on the device. The trigger arm and the attachment means is used to place a company name or logo, or describe some event. The low manufacture costs of the device could make it a unique tradeshow or customer gift that would always bear the presenter's message. The unit is manufacturable in different colors, and the trigger arm is configurable to any shape or design for aesthetics or for marketing purposes.

Another object of the invention is a device is that the trigger arm can be rotated. In some embodiments, the trigger arm could freely rotate a fixed number of degrees in the trigger arm plane, and in other embodiment is rotatable a full 360 degrees. Other embodiments allow the trigger to have a degree of freedom in a plane other than the trigger arm plane. The trigger arm can be angularly disposed in an orientation other than perpendicular to the mouse button. The additional degrees of freedom provide further flexibility for the user.

In one embodiment, the device comprises an attaching means connected to a mouse button. A trigger arm is connected to the attaching means, wherein the trigger is angularly disposed to the attaching means. In the preferred embodiment, the trigger arm is 'L' shaped, where one member is parallel to the mouse button and secured to the attaching means, while the other section is approximately perpendicular to the mouse button. It is also possible to have the trigger arm as a straight member disposed in a socket that allows the trigger arm to move in the socket, thereby providing multiple means to operate the mouse button. Furthermore, the trigger arm can be affixed to a single button or moveable to the other mouse buttons. Multiple trigger arms are also within the scope of the present invention.

The shape and design of the trigger arm can vary depending upon the mouse design, the placement of the attaching means, and user preference. The trigger arm is plastic in the preferred embodiment, so that the manufacturing costs are minimized. An additional benefit of plastic manufacturing is the ability to design different trigger arm shapes and configurations. The trigger arm could be a linear rod, a polygonic member, a spherical member, or a substantially flat member. The length of the trigger arm can be preset at an optimal height, or allow the user to cut or break-away the trigger arm to custom height. Telescoping and extendable trigger arms are also possible so that the device can vary depending upon the usage.

An additional object is to provide a trigger arm that can be rotated and angularly disposed to provide a variety of operating positions. In the 'L' shaped embodiment, the member that is angularly disposed from the mouse button can be rotated a fixed number of degrees or a full 360 degrees about the attaching means. The trigger arm can also be fixed substantially perpendicular to the mouse button or set to a different angle. There can be a locking means to secure the trigger arm in a single position. A typical method is to use bumps in the plastic so that the trigger arm would be forced between the bumps. In order to move the trigger position to a different setting, the user would have to apply force to overcome the bump. Furthermore, an opposing post or hook attached on a side opposite the mouse apparatus to provide an opposing force during operation and a gripping position of the various fingers not activating the trigger arm is within the scope of the invention.

And yet another object is to provide the trigger arm with a curvature. An arc shaped trigger arm would provide a more secure and resting finger position. The trigger arm should allow for easy gripping, and could come with a textured of ribbed surface. The trigger arm could employ a ball or other shape for ornamentation or ergonomic purposes on the upper surface. And, the trigger arm could also be formed as a spherical shape, like a golf ball, attachable to the mouse button to provide a full range of contact positions.

Another object, particularly for the 'L' shaped embodiment, is to provide a device wherein the trigger arm has a nub or pointer on the member parallel to the mouse buttons. The nub or pointer would make contact with the mouse button and can be used to lessen the amount of force required to click the button by reducing the distance between the mouse button and the trigger arm or otherwise changing the incident angle of contact.

An object of the invention is to provide a device wherein the trigger arm is hingedly affixed to a side of the mouse and retractable. A side attachment would permit easy storage of the device when not in use alongside the length of the mouse. When the device is desired, it is employed quickly and easily. The trigger arm could be telescoping so that the arm be adjustable in length.

A further object of the invention is to provide an attaching means that can vary depending on the mouse design and user preference. If a removable or temporary attachment is desired, the attaching means can be Velcro, adhesives, or retaining clip/snap-fit methods. The adhesives can be temporary or permanent and may come as an accessory or with affixing instructions with the mouse apparatus. For example depending on the composition, acetone could be used to adhere the unit firmly in place. The snap-fit or retaining clip variation can take advantage of a particular mouse design and grip the spaces and gaps on the mouse. Clips can fit between the mouse buttons to secure the device to a particular button, or can clip across the surface of the buttons. In the latter embodiment, the device can slidably engage the attaching means and be moveable from one button to the next. In a preferred embodiment, the plastic snap fit unit has a pointed head and a retention collar, wherein the pointed hit is inserted into a mating cavity on the mouse. Once inserted, the plastic collar holds the unit in place.

Other attaching means are within the scope of the invention, including screws, rivets, and snaps. The attaching means can be implemented on the surface of the mouse button, on the side of the mouse, or on the front of the mouse. The mouse surface can employ a threaded screw hole, socket, or fastening snap to attach the trigger arm. Likewise, the front or side variation can use sockets, threaded holes, and fastening snaps to retain the trigger arm. The latter embodiments can use engaging/retracting means to deploy the present invention when desired or needed.

The trigger arm is attached to the mouse button at a location that provide optimal clicking response, depending on the design and user preference. In most embodiments, the trigger arm is positioned in the approximate center of the mouse button. However, different embodiments or user preference allow other placements. The overall goal of the device is to provide multiple clicker contact point, and allow easy manipulation of the mouse buttons. In one of the variations, the combination of the attaching means and the trigger arm produce a certain degree of flexibility in the trigger arm so that there is some spring in the implementation.

Yet a further object is to provide a mouse apparatus with the trigger arm manufactured into the design. The trigger arm can extend from the mouse button angularly. It can be permanently integrated into the design or made as a retractable unit or otherwise engageable from a mounting position. A swivel socket or flip-up mechanism can be implemented to adhere the trigger arm to the front or side of the mouse.

When the user desires to use the ergonomic apparatus, it can easily be deployed. There can be a groove or rail mechanism incorporated into the gaps or spacing of the mouse so that the present invention is sidably engageable along the groove.

Yet a further object is to provide a device that increases accessibility for those with arthritis, injuries, disabilities, neurological disorders, birth defects or a general inability to control mouse buttons. The present invention can allow a user to operate the mouse control more effectively with impaired finger dexterity. The trigger arm can help improve the computer skills and commercial potential for those having difficulty with standard mice designs.

Another object of the invention is to provide for attachment of the trigger arm at a mid-section of said one or more mouse buttons. In certain embodiments, a mid-section placement provides the most flexibility in rotating and pivoting the trigger arm. The force required to operate the mouse buttons varies slightly with placement. In the 'L' shaped embodiment the member extending angularly can be pushed or pulled to operate the mouse button. The actual force required to depress the button is derived from the direction of the force, the shape of the device, and the attachment location. In the embodiment where the one member extends perpendicularly from the attaching member, pulling the perpendicular member changes the location of the directional downward force as compared to pushing the member. The location of the attaching means on the attaching member is also a factor in this embodiment. If the attaching means is situated at a midpoint of the attaching member, more force may be required than if the attaching means is located on a opposing side from the perpendicular member.

An additional object of the invention is to manufacture the article from plastic or similar synthetic material that can be easily molded and cost-effectively manufactured. The entire assembly can be plastic and although the device can be installed onto existing mice, manufacturing the device into new mice provides a more efficient means of disseminating the benefits of the device as well as increasing the methods of attaching and variations in the design of the trigger arm. The trigger arm can have substantially flattened portions and include a company logo or other advertisement. This use of the device could be used to promote and advertise various organizations and services. The width and height and shape of the trigger arm can be varied to accommodate any reasonable length of advertisement or logo. Although the device is preferably made of plastic, other compositions are within the scope of the invention.

A further object of the invention is to provide maximum user flexibility, and besides being rotatable about the attaching means, the trigger arm can be pivotable in one degree of freedom, two degrees of freedom, and even three degrees of freedom by using telescoping or extendable trigger arm members or spherical shaped members. One degree of freedom refers to the ability of the device to move in a single plane. For example, if the trigger arm was perpendicular to the mouse button, the trigger arm would rotate either side to side or front to back. Two degrees of freedom would allow the unit to move both back and forth and side to side. The third degree of freedom would allow the unit t o move back and forth, side to side, and upwards and downwards.

An object of the invention includes employing a locking or retention means to secure the trigger arm in a single position. As is well known in the industry, plastic components can have indents or notches where a post resides. In order to reposition the post, a directional force is required to move the post into a different notch or indent. Various other means are commonplace in the industry, and any of these can be used to maintain the location of the device, in whatever circumferential rotation or degree of freedom required by the user.

An object of the invention is an ergonomic mouse apparatus for improving operation of a computer mouse, having a trigger arm for controlling one or more mouse buttons, wherein the trigger arm extends angularly from the one or more mouse buttons, an attaching means securing the trigger arm to the one or more mouse buttons. Further providing the apparatus with the trigger arm perpendicular to the attaching means. And, wherein the trigger arm is moveable during use, so that the user can change the hand position frequently and avoid repetition or inflammation of nerves or tendons.

Another object includes an ergonomic mouse apparatus, wherein the trigger arm is angularly adjustable. This angular adjustment is referenced from the mouse surface such that for the linear post, a hinge or socket would permit the post to be positioned perpendicular or at another more desirable angle. A locking mechanism would secure the post in a single position. Not only can the unit be adjusted in angular placement in a single direction, but the angular displacement can occur in any direction. For example, the linear post can be positioned away from the mouse at a sixty degree angle from the mouse button.

An additional object is an ergonomic mouse apparatus, wherein the attaching means is an adhesive. The adhesive could be a sticky substance that is removable from the mouse surface, or a more permanent adhesive. Depending on the type of plastic, an acetone composition could be used to adhere the plastic components. The adhesive could be included in a kit with the unit or provided with instructions for installation.

Yet a further object is an ergonomic mouse apparatus, wherein the attaching means is Velcro. The use of Velcro would require one of the mating Velcro elements to be attached to the mouse button, and the mating section would be adhered to the other mating element. To secure the trigger arm to the unit, the mating Velcro sections would be connected.

Another object is for an ergonomic mouse apparatus, wherein the attaching means comprises one or more retaining clips, wherein the retaining clips grip on both sides of one of the one or more mouse buttons. The clips can be tabs that grip the gaps in the mouse structure, either for a single mouse button or the entire surface of the mouse buttons.

Further objects include an ergonomic mouse apparatus, wherein the attaching means is a retaining clip that grips on opposing sides of the mouse, and wherein the apparatus is slidably engageable across the one or more mouse buttons. A slidable device permits maximum flexibility to use the apparatus on any of the mouse buttons.

And yet another object, an ergonomic mouse apparatus, wherein the attaching means is a screw engaging a threaded portion of the one or more mouse buttons. The mouse requires a pre-drilled hole for placement of the screw engaging portion. A pointed fastener with a collar is also within the scope of the invention.

Further object includes an ergonomic mouse apparatus, wherein the trigger arm is deployed within a socket. The socket permits installation of the trigger arm to the mouse button, and permits swingable and angular manipulation. The socket may include some retention mechanisms that lock the trigger arm in position when set by the user.

Another object is an ergonomic mouse apparatus, wherein the trigger arm has a curvature. The curvature aids in gripping the device with fingers, and allows the user to create a more comfortable hand position. A ribbed or roughened surface of the trigger also helps to prevent slippage.

Further object is an ergonomic mouse apparatus, further comprising a retention means for retaining the trigger arm in one of a plurality of predetermined positions. The retention mechanisms are well known in the industry and may include bumps, slots, or notched sections.

An object of the invention is an ergonomic mouse apparatus for improving operation of a computer mouse, comprising a trigger arm for controlling one or more mouse buttons, wherein the trigger arm comprises a first member substantially parallel to the one or more mouse buttons, and wherein a second member extends angularly from the first member, and an attaching means connecting the first member to the one or more mouse buttons, securing the trigger arm to the one or more mouse buttons.

And, an object provides an ergonomic mouse apparatus, wherein the second member extends substantially perpendicular to said first member. The trigger arm or post can protrude at approximately ninety degrees or a perpendicular orientation. Further object includes the ergonomic mouse apparatus, wherein the trigger arm is adjustable in height, the trigger arm is adjustable in width, and the trigger arm is capable of rotating 360 degrees about the attaching means, or any fixed segment of degrees. And, an ergonomic mouse apparatus, wherein the trigger arm is moveable in two degrees of freedom. For example, the trigger can move forward or backwards and right or left relative to a position perpendicular to the mouse.

An additional object is an ergonomic mouse apparatus, further comprising a nub on the first member of the trigger arm. The nub or pointer re-positions the point of contact between the trigger arm and the mouse button. Depending on the design, the nub can reduce the distance between the trigger arm and the mouse button, enabling faster response times and lesser force to click the mouse button.

An object of the invention is an ergonomic mouse apparatus for improving operation of a computer mouse, comprising a trigger arm for controlling one or more mouse buttons, wherein the trigger arm is retractable and extends angularly from one or more mouse buttons.

An additional object for the ergonomic mouse apparatus, wherein the trigger arm is hingedly connected to the mouse. The trigger arm can be installed or manufactured so that the device can be flipped into position when needed, and stored when not in use.

Still other objects and advantages of the present invention will become readily apparent to those skilled in this art from the following detailed description, wherein only a preferred embodiment of the invention is described, simply by way of illustration of the best mode contemplated for carrying out the invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE PREFERRED EMBODIMENT

Figure 1:
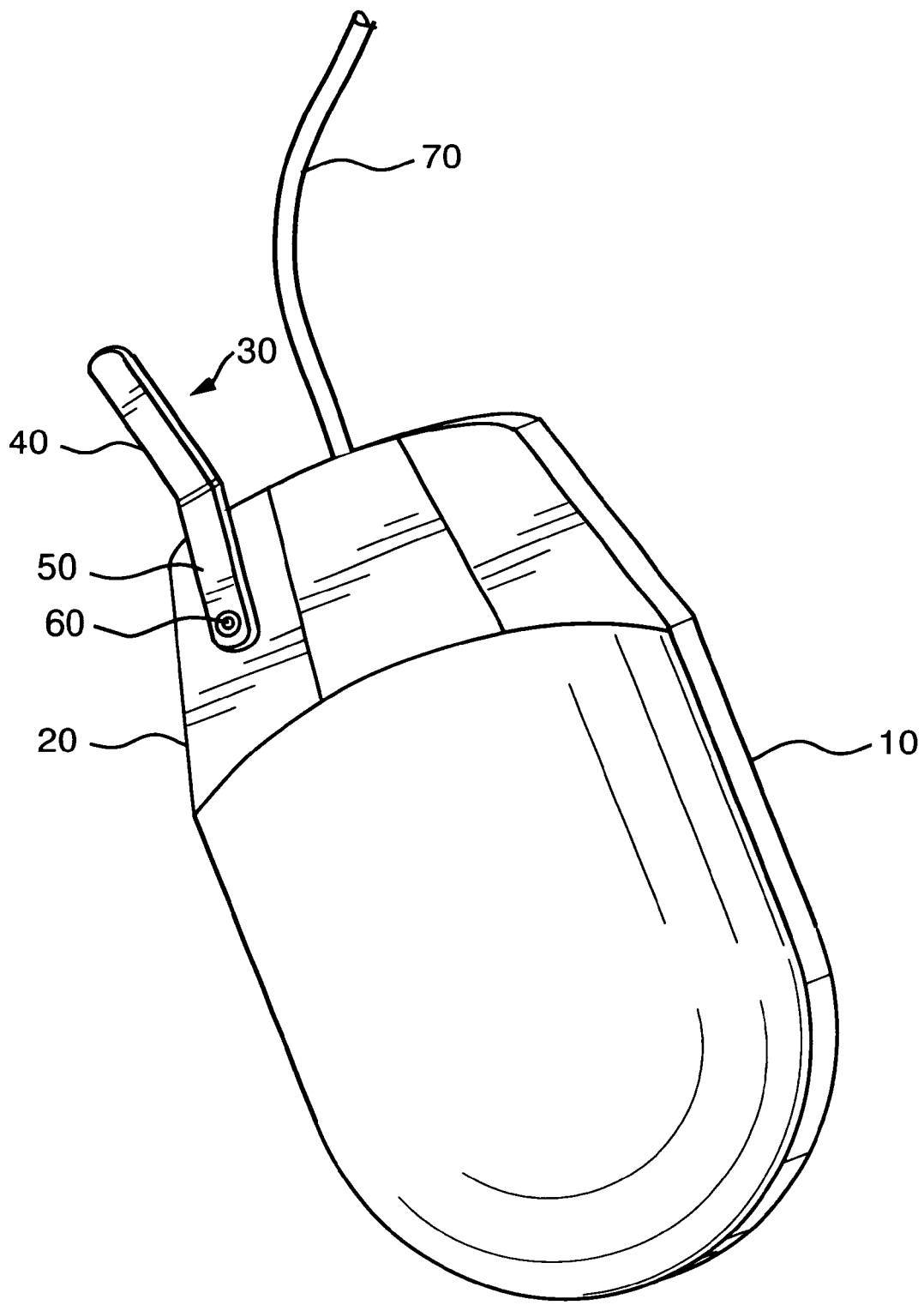
FIG. 1 is a top view of the ergonomic mouse accessory attached to a mouse control button with the vertical arm in the front position.
Figure 2:
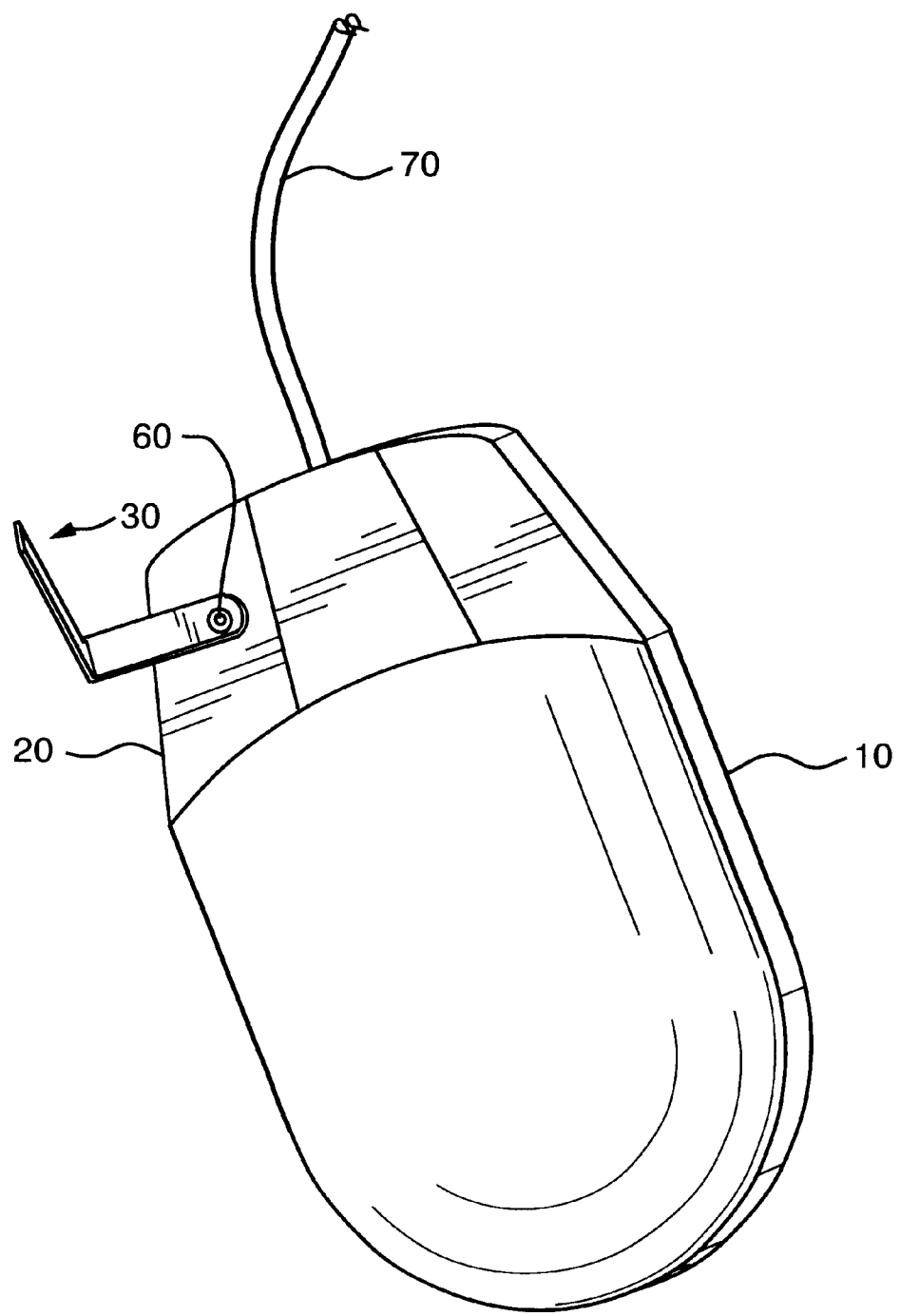
FIG. 2 is a top view of the ergonomic mouse accessory attached to a mouse control button with the vertical arm in the left position.

In FIGS. 1 and 2, one embodiment of the present invention is shown. Using a generic three-button mouse 10 connected to a computer by a wired connection 70, the approximately 'L' shaped structure 30 is affixed to a mouse control button 20, with a first member 50 substantially parallel to the mouse buttons and a second member 40 angularly disposed from the first member. In one embodiment, the second member 50 is perpendicular to the first member 40. The structure 30 is pivotably connected by a retention mechanism 60. In this embodiment, the structure 30 can swing a full 360 degrees about the retention mechanism and allow the user to operate the control buttons with any finger. FIG. 1 depicts the device 30 in a parallel relationship with the mouse control buttons 20, where as FIG. 2 shows the device 30 oriented perpendicular to the mouse control buttons 20. The user can vary the position of the vertical member 40 so that a thumb, index finger, or any finger or member can accurately operate the control buttons 20.

Figure 3:
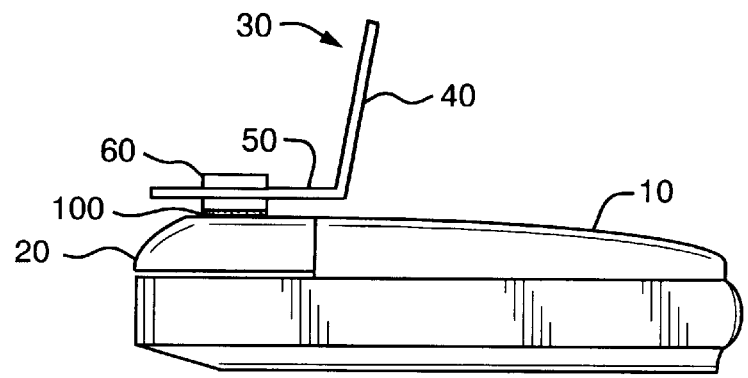
FIG. 3 is a side view of the ergonomic mouse accessory as attached to a mouse control button.

FIG. 3 shows the device 30 attached to the mouse control button 20. An affixing means 100, such as glue or Velcro is depicted for adhering the device 30 with the retention mechanism 60 holding the horizontal component or arm 50 of the device 30. The adhesive can be temporary or permanent, and come with the unit in kit form or attachable per user instructions.

Figure 4A:
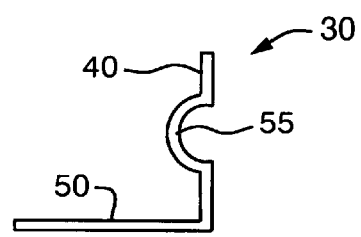
FIG. 4(a) shows the curvature of the trigger arm.

FIG. 4(a) illustrates the trigger arm with a curvature 55 so that the finger can grip the trigger arm securely. The curvature 55 creates a resting place for the finger and is especially favorable for using a thumb as the mouse controller. It also maintains the finger in the optimal position on the member, and keeps the finger from inadvertently slipping off the device.

Figure 4B:
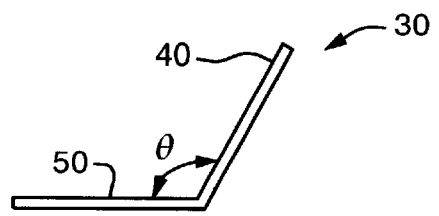
FIG. 4(b) shows the trigger arm at an angular position.

Although the present orientation of the trigger arm rising from the buttons is perpendicular, any angular orientation is within the scope of the invention. There are some advantages to a non-perpendicular orientation that would provide more convenience or ergonomic benefits. Such an orientation is illustrated in FIG. 4(b), where the angle θ is greater than 90 degrees.

Figure 5A:
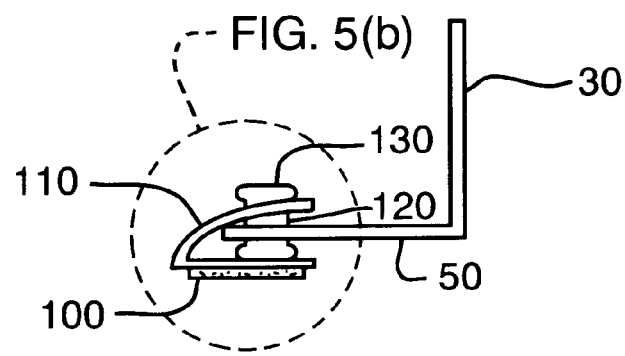
FIG. 5(a) is a side view of the horizontal arm of the present invention connected to the mouse attachment.
Figure 5B:
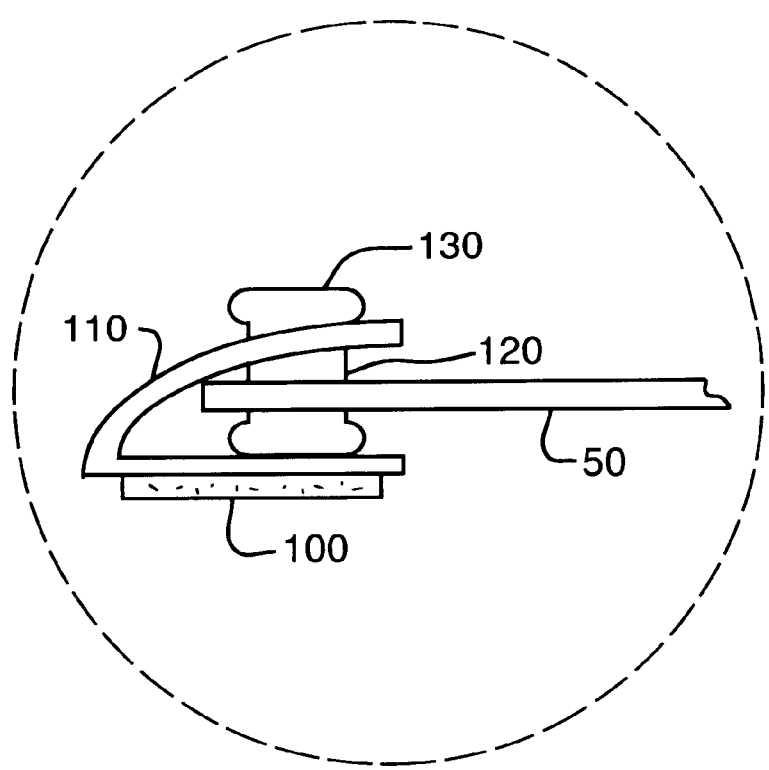
FIG. 5(b) is an exploded view of the horizontal arm of the present invention connected to the mouse attachment.

One embodiment of the present invention is to use a arc shaped retainer 110 with a securing member 120 holding the horizontal arm 50 of the device, as shown in FIGS. 5(a) and 5(b). The securing member can be a rivet, screw, or bolt that goes through the center of the horizontal arm 50 and allows the device 30 to rotate greater than 180 degrees. The underside of the arc shaped retainer 110 has an affixing means 100, such as adhesive or Velcro.

Figure 6A:
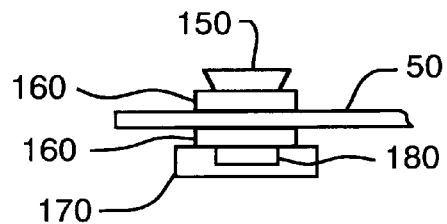
FIG. 6(a) is a side view of the horizontal arm attachment means using a threaded member that secures to an attachment plate.
Figure 6B:
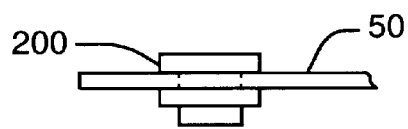
FIG. 6(b) is a side view of the horizontal arm attachment means using a press-fit plastics.
Figure 6C:
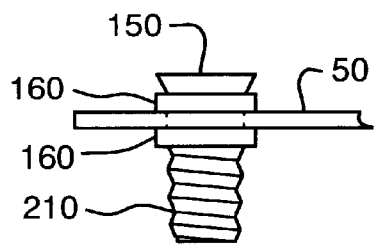
FIG. 6(c) is a side view of the horizontal arm attachment means using a threaded member that secures into the mouse.
Figure 6D:
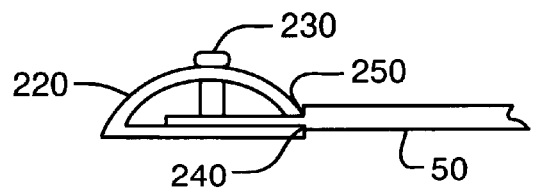
FIG. 6(d) is a side view of the horizontal arm attachment means using a arc shaped plastic member and a fastener.

The FIGS. 6(a)–(d) show various retention techniques for securing the horizontal arm 50 of the device 30. In FIG. 6(a) a screw 150 can be used in conjunction with nylon washers 160 to rotatably secure the arm 50. The screw 150 can screw into a bolt-type member that can then be adhered to the mouse control button. FIG. 6(b) shows the retention apparatus as a press-fit member 200 having two sleeves that snap together and hold the horizontal arm 50. A variation that is well known in the prior art is a pointed member with a collar on either side of the horizontal arm, such that once the pointed head is inserted into the mating hole in the mouse, the unit is secured. In FIG. 6(c), a screw 150 member goes through the horizontal arm 50, with accompanying washers 160, and the threads 210 can be screwed into a pre-drilled threaded section of the control button. Another embodiment is shown in FIG. 6(d), where an arc shaped retainer 220 that fits into cut-out sections of the horizontal arm 240, 250 so that the arm 50 snaps into certain positions rather than be rotatable across the full spectrum. A rivet 230 can flexibly adhere the arc shaped retainer 220 to the arm 50.

Figure 7A:
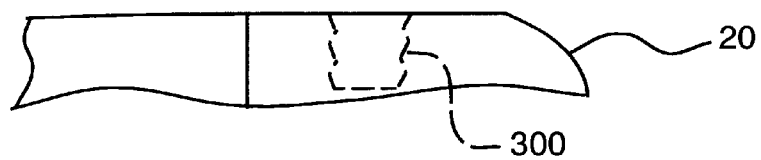
FIG. 7(a) is a side view of a control button of the computer mouse, showing the threaded insert in the mouse button.
Figure 7B:
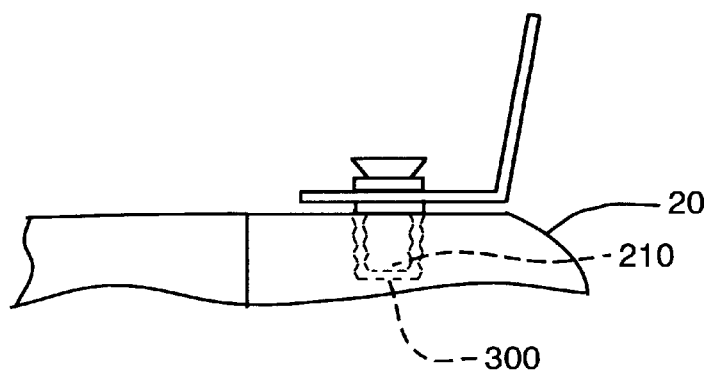
FIG. 7(b) is a side view of a control button of the computer mouse, showing the present invention secured to the mouse by the threaded member screwed into the mouse.
Figure 8A:
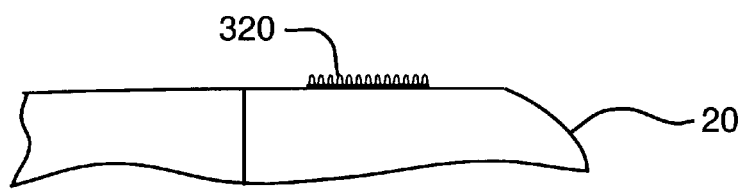
FIG. 8(a) is a side view of a control button of the computer mouse, showing a Velcro section affixed to the control button.
Figure 8B:
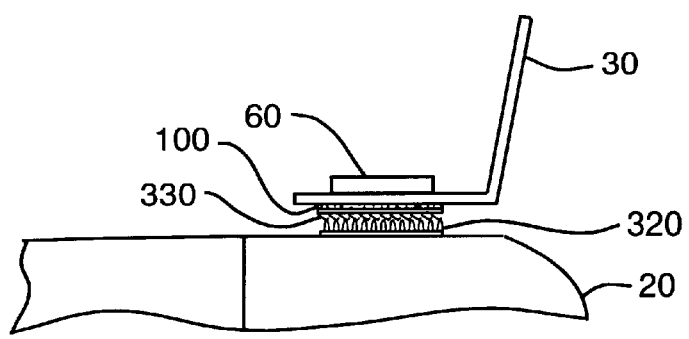
FIG. 8(b) is a side view of a control button of the computer mouse, showing a the present invention secured to the mouse by Velcro.

FIGS. 7 and 8 show two different embodiments to secure the retainer device to the mouse control button 20. FIGS. 7(a) and 7(b) show threaded sections in the control button 300 that allow the screw threads 210 from the screw 150 to join the two units. As is known in the industry, a pointed barb with a retaining collar can be used to snap into a receptacle on the mouse. FIGS. 8(a) and 8(b) show a Velcro strip 320 adhered to the mouse control button 20, and the mating Velcro strip 330 connecting the two pieces. As already disclosed, an adhesive 100 on the underside of the retaining device 60 is used to adhere the trigger arm 30.

Figure 9:
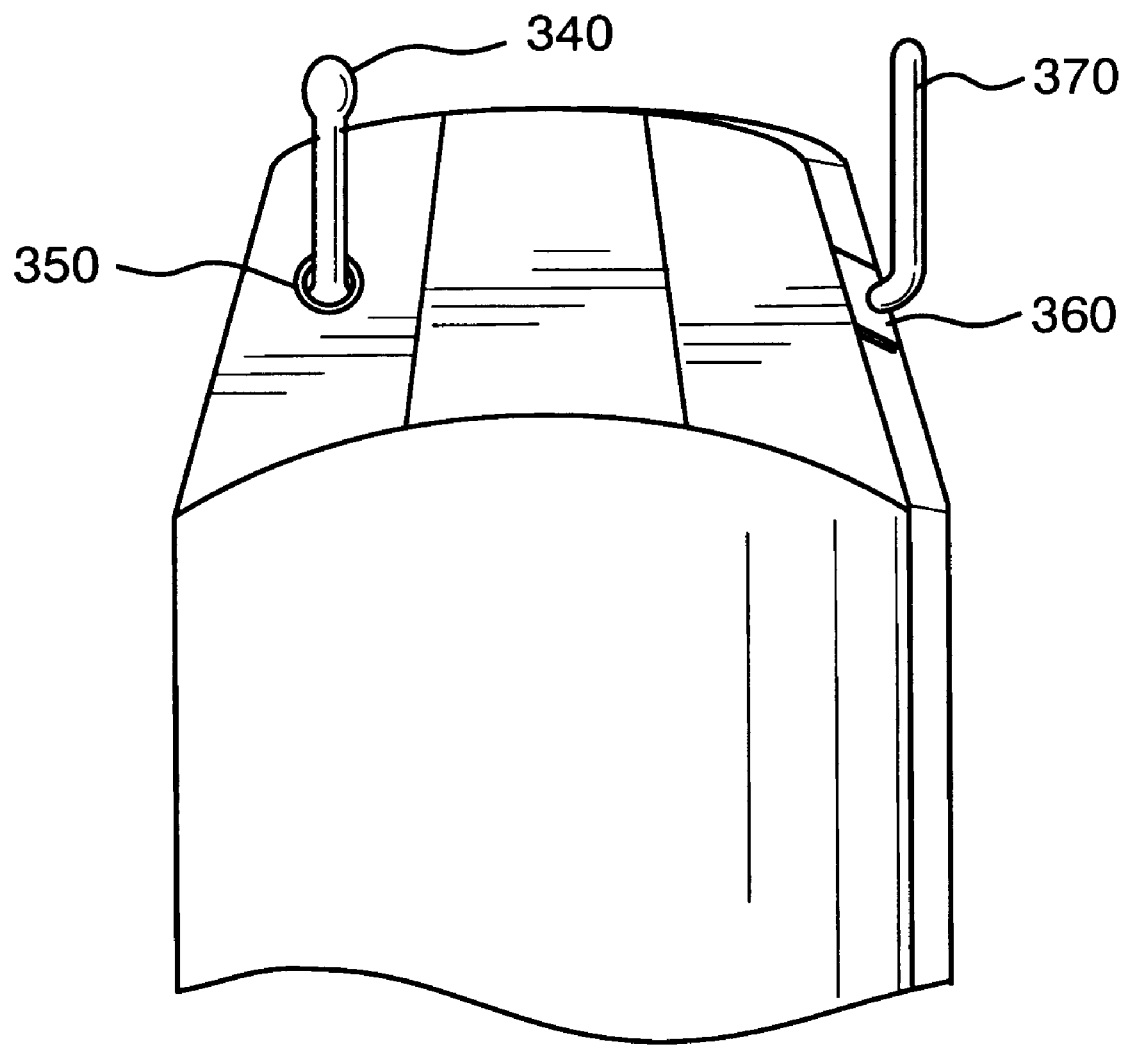
FIG. 9 shows a trigger arm in a socket and a side mount opposing arm.

A different trigger arm variations is shown in FIG. 9. A linear trigger arm 340 is disposed within an attaching means 350. The attaching means could be a manufactured retention mechanism that would allow replacement if the device, or it could be simply manufactured into the mold. A socket could be utilized to secure the trigger arm 340, and a swivel socket would provide a means of altering the angular disposition of the trigger arm. The assembly can be installed anywhere onto the surface of the mouse button, or alternatively be mounted on a front or side of the mouse. A flip-up opposing post 370 is shown on the side of the mouse, deployed by a hinge connection 360. The opposing post 370 is particularly useful when the trigger arm 340 is operated by the thumb, and the rest of the fingers can grip the opposing post.

Figure 10A:
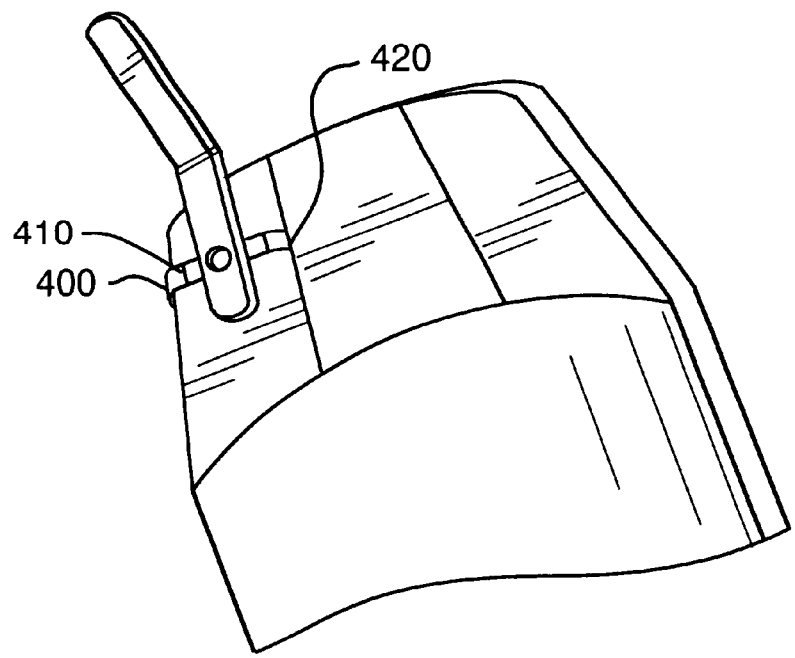
FIG. 10(a) is a top view of the ergonomic mouse accessory attached to a mouse control button with a single button adjustable clip assembly.
Figure 10B:
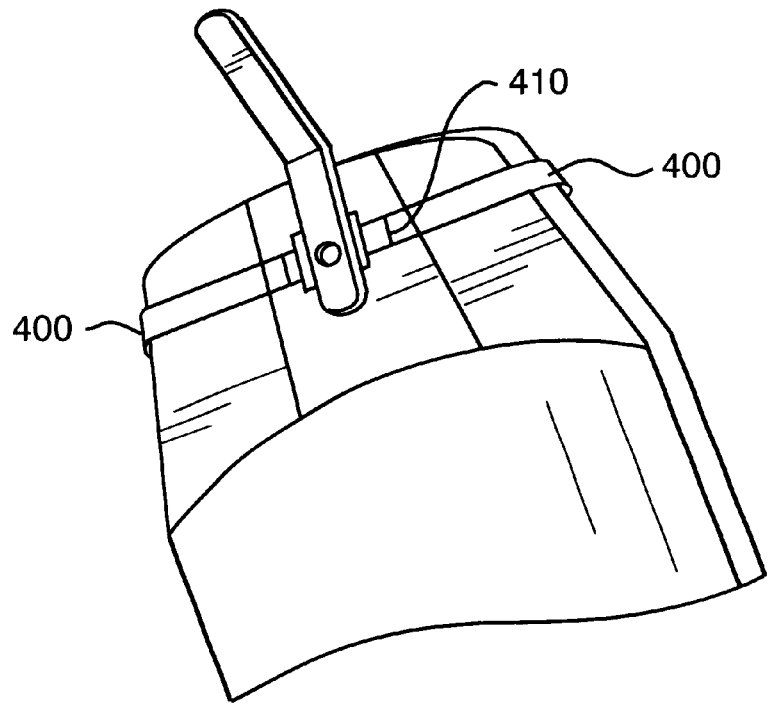
FIG. 10(b) is a top view of the ergonomic mouse accessory attached to a mouse control button with a multiple button adjustable clip assembly.
Figure 11:
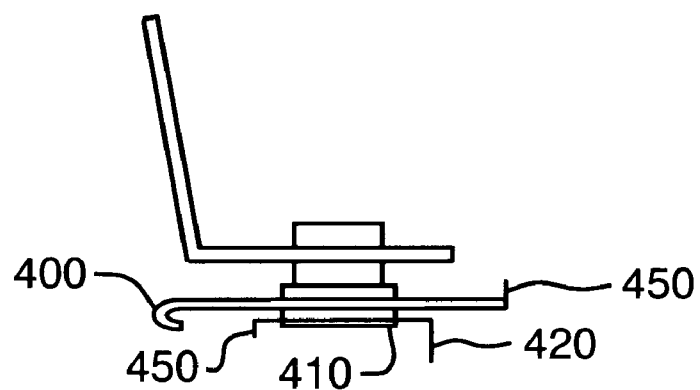
FIG. 11 is a side view of the single button adjustable clip assembly.

A clip-on retainer device is shown in FIGS. 10–11. FIG. 10(*a*) shows a side clip 400 and an inner button clip 420 to adhere the device to the control button. The device can employ a sliding member 410 so that the clip can accommodate any width of the control button. FIG. 10(*b*) has side clips 400 on both sides and can allow the device to slide across the control buttons 20 so that it can be used on any of the buttons 20. The sliding bar 410 can employ stops 450 to keep the clip-on attachment together.

Figure 12:
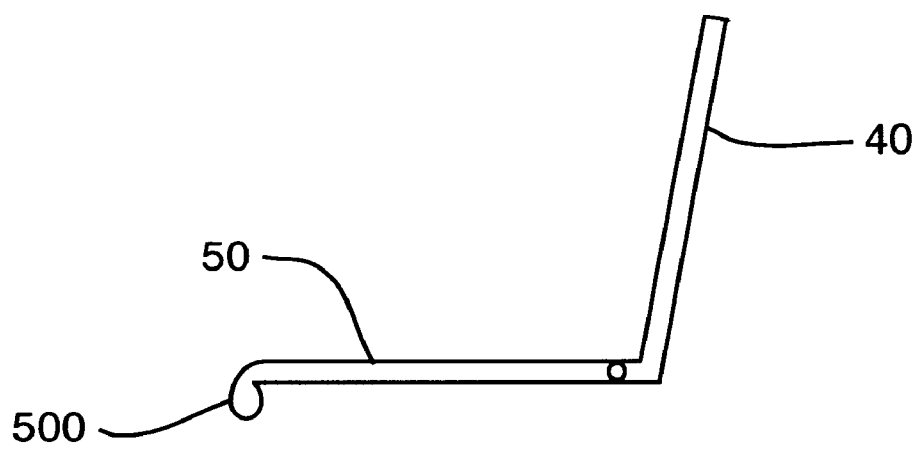
FIG. 12 is a side view of the ergonomic mouse accessory with a pointer/nub.

A further feature is a pointer or nub 500 that extends from the parallel member of the trigger arm 50 towards the button to aid in the clicking operation, as shown in FIG. 12. The nub 500 can be a molded bump or other projection that reduces the contacting distance between the button and the device. The pointer can also be an angular projection to change the angle of incidence between the trigger arm and the mouse button.

In operation, the attaching means secures the trigger arm to the mouse button. For example, an adhesive can be used as the attaching means, and the unit is placed at approximately the center of the mouse button. In the preferred embodiment, the 'L' shaped trigger arm has an attachment with a collared rivet that is inserted into the mouse upper button surface about which the trigger can rotate. The user can pull the trigger arm to manipulate the mouse button, leaving the arm in a more natural position. Only a small degree of force is required to operate the mouse buttons as the force is exerted downwards through the point of contact. During operation the user shifts positions and operates the mouse with different muscle groups.

It is well within the scope of the invention to incorporate existing attachment mechanisms and employ manufacturing and molding techniques to incorporate and operate the present invention. The present invention has been particularly shown and described with respect to certain preferred embodiments of features. However, it should be readily apparent to those of ordinary skill in the art that various changes and modifications in form and details may be made without departing from the spirit and scope of the invention. Additional objects and advantages of the present invention may be further realized and attained by means of the instrumentalities and combinations all within the scope of the claims. The drawings and description are to be regarded as illustrative in nature, and not as restrictive.

No warranty is expressed or implied as to the actual degree of safety, security or support of any particular specimen of the invention in whole or in part, due to differences in actual production designs, materials and use of the products of the invention.

What is claimed is:

1. An ergonomic mouse apparatus for improving operation of a computer mouse, comprising:
    a rotating trigger arm for actuating one or more mouse buttons, wherein said trigger arm extends angularly and is pivotably connected from said one or more mouse buttons forming a fulcrum and lever operation with said mouse buttons; and
    an attaching means for securing said rotating trigger arm to said one or more mouse buttons.

2. An ergonomic mouse apparatus according to claim 1, wherein said trigger arm is perpendicular to said attaching means.

3. An ergonomic mouse apparatus according to claim 1, wherein said trigger arm is angularly adjustable.

4. An ergonomic mouse apparatus according to claim 1, wherein said attaching means is an adhesive.

5. An ergonomic mouse apparatus according to claim 1, wherein said trigger arm is moveable during use.

6. An ergonomic mouse apparatus according to claim 1, wherein said attaching means comprises one or more retaining clips, wherein said retaining clips grip on both sides of one of said one or more mouse buttons.

7. An ergonomic mouse apparatus according to claim 1, wherein said attaching means is a retaining clip that grips on opposing sides of said mouse, and wherein said apparatus is slidably engageable across said one or more mouse buttons.

8. An ergonomic mouse apparatus according to claim 1, wherein said attaching means is a screw engaging a threaded portion of said one or more mouse buttons.

9. An ergonomic mouse apparatus according to claim 1, wherein said trigger arm is deployed within a socket.

10. An ergonomic mouse apparatus according to claim 1, wherein said trigger arm has a curvature.

11. An ergonomic mouse apparatus according to claim 1, further comprising a retention means for retaining said trigger arm in one of a plurality of predetermined positions.

12. An ergonomic mouse apparatus for improving operation of a computer mouse, comprising:
    a trigger arm for controlling one or more mouse buttons, wherein said trigger arm comprises a first member flexibly disposed substantially parallel to said one or more mouse buttons, and wherein a second member extends angularly from said first member; and
    an attaching means for connecting said first member to said one or more mouse buttons, pivotably securing said trigger arm to said one or more mouse buttons forming a fulcrum and lever operation with said mouse buttons, and wherein said trigger arm is rotatable about said attaching means.

13. An ergonomic mouse apparatus according to claim 12, wherein said second member extends substantially perpendicular to said first member.

14. An ergonomic mouse apparatus according to claim 12, wherein said trigger arm is adjustable in height.

15. An ergonomic mouse apparatus according to claim 12, wherein said trigger arm is adjustable in width.

16. An ergonomic mouse apparatus according to claim 12, wherein said trigger arm is capable of rotating 360 degrees about said attaching means.

17. An ergonomic mouse apparatus according to claim 12, further comprising a nub on said first member of said trigger arm.

18. An ergonomic mouse apparatus according to claim 12, wherein said trigger arm is moveable in two degrees of freedom.

19. An ergonomic mouse apparatus for improving operation of a computer mouse, comprising:
    a trigger arm for controlling one or more mouse buttons, wherein said trigger arm is retractable and extends angularly and from one or more mouse buttons; and
    a retention means for connecting said trigger arm to said one or more mouse buttons.

20. An ergonomic mouse apparatus according to claim 19, wherein said trigger arm is hingedly connected to said mouse.

* * * * *

UNITED STATES PATENT AND TRADEMARK OFFICE
CERTIFICATE OF CORRECTION

PATENT NO. : 6,417,842 B1
DATED : July 9, 2002
INVENTOR(S) : Wesley E. Shattuck

It is certified that error appears in the above-identified patent and that said Letters Patent is hereby corrected as shown below:

<u>Title page, Item [54] and Column 1, line 1,</u>
Title, delete "ENGONOMIC", insert -- ERGONOMIC --

Signed and Sealed this

Fifth Day of November, 2002

*Attest:*

*Attesting Officer*

JAMES E. ROGAN
*Director of the United States Patent and Trademark Office*